US012741677B2

(12) United States Patent
Keller et al.

(10) Patent No.: US 12,741,677 B2
(45) Date of Patent: Sep. 22, 2026

(54) METHOD AND SYSTEM FOR AUTONOMOUS BEHAVIOR PLANNING AND CONTROL USING EPISTEMIC UNCERTAINTIES OF PARTICIPANTS IN A TRAFFIC SCENE

(71) Applicant: Robert Bosch GmbH, Stuttgart (DE)

(72) Inventors: Max Keller, Korntal-Muenchingen (DE); Faris Janjos, Stuttgart (DE); Maxim Dolgov, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 18/628,981

(22) Filed: Apr. 8, 2024

(65) Prior Publication Data

US 2024/0367687 A1 Nov. 7, 2024

(30) Foreign Application Priority Data

May 3, 2023 (DE) ..................... 10 2023 204 069.7

(51) Int. Cl.
*B60W 60/00* (2020.01)

(52) U.S. Cl.
CPC ..... *B60W 60/0027* (2020.02); *B60W 2555/20* (2020.02)

(58) Field of Classification Search
None
See application file for complete search history.

(56) References Cited

U.S. PATENT DOCUMENTS 11,157,010 B1 * 10/2021 Narang .................. G06N 20/00
2020/0326667 A1 * 10/2020 Ahuja ................. G06F 18/2431
2022/0234617 A1 * 7/2022 Sholingar ............. B60W 40/06
2022/0269279 A1 * 8/2022 Redford ................... G05D 1/81

FOREIGN PATENT DOCUMENTS

DE 102008062916 A1 6/2010
DE 102018202966 A1 8/2019
DE 102020109662 A1 10/2021

* cited by examiner

*Primary Examiner* — James J Lee
*Assistant Examiner* — Jonathan E Reinert
(74) *Attorney, Agent, or Firm* — Norton Rose Fulbright US LLP

(57) ABSTRACT

A computer-implemented method for behavior planning for a first participant in a traffic scene, in which a predicted behavior of at least one further participant in the traffic scene is taken into account, specifically depending on the epistemic uncertainty of the predicted behavior. For this purpose, the behavior of the further participant is predicted at regular time intervals, in each case for a prediction interval of a specified length, wherein each prediction interval includes a specified number of consecutive prediction steps. The epistemic uncertainty of the predicted behavior is determined for each prediction step of a prediction interval and is evaluated using a decision criterion to decide whether the behavior of the further participant predicted for the corresponding prediction step is taken into account in the behavior planning for the first participant.

8 Claims, 1 Drawing Sheet

METHOD AND SYSTEM FOR AUTONOMOUS BEHAVIOR PLANNING AND CONTROL USING EPISTEMIC UNCERTAINTIES OF PARTICIPANTS IN A TRAFFIC SCENE

CROSS REFERENCE

The present application claims the benefit under 35 U.S.C. § 119 of German Patent Application No. DE 10 2023 204 069.7 filed on May 3, 2023, which is expressly incorporated herein by reference in its entirety.

BACKGROUND INFORMATION

The present invention relates to a computer-implemented method for behavior planning for a first participant in a traffic scene, in which a predicted behavior of at least one further participant in the traffic scene is taken into account, specifically depending on the epistemic uncertainty of the predicted behavior. The behavior of the further participant is predicted at regular time intervals, in each case for a prediction interval of a specified length, wherein each prediction interval comprises a specified number of consecutive prediction steps.

The prediction for a prediction interval is thus composed of the predictions for the individual prediction steps of the prediction interval. A prediction step can correspond either to a single time step or also to a time segment, which comprises a plurality of time steps. The consecutive prediction intervals generally overlap, wherein the degree of overlap depends on the time interval, or the frequency of the prediction, and the length of the prediction intervals. The result of the behavior planning for the first participant in the traffic scene and also the predicted behavior of the further participant in the traffic scene are usually described by trajectory data, which comprise position data and/or stay duration probabilities, movement data and/or orientation data of the corresponding participant, for each prediction step of a prediction interval.

In order to be able to plan safe and plausible maneuvers, automated vehicles must anticipate how the current traffic scene will develop and in particular how further participants in the traffic scene, such as motorized vehicles, bicyclists and pedestrians, will behave in the future. For this purpose, the future behavior of the other road users is predicted and passed to the planning component of the automated vehicle. Traditional prediction methods generally carry out a prediction based on dynamics. They can model the interactions between the road users only to a limited extent. For this reason, the use of machine learning, in particular deep learning (DL), has established itself in recent years as the de facto standard for prediction. Furthermore, in comparison to traditional prediction methods, machine learning methods offer the possibility of including extensive and diverse context information in the prediction.

In any case, the prediction of the behavior of a participant in a traffic scene is based on scene-specific information which is aggregated at a current point in time. On the basis of this information, DL-based prediction components generate a specified number of behavior options for a prediction interval, i.e., for a future time segment of a defined duration. A plurality of different behavior options for the participant are generally predicted within the scope of such a prediction. However, applications for which the prediction of only one behavior option is sufficient are also possible.

Depending on the type of output of the prediction result, a distinction is made between so-called one-shot prediction methods and autoregressive prediction methods. In one-shot prediction methods, the behavior of the participant is predicted in a single step for the entire prediction interval, i.e., for all prediction steps of the prediction interval, solely on the basis of the aggregated scene-specific information. In contrast, in autoregressive prediction methods, each prediction step of a prediction interval takes into account not only the aggregated scene-specific information but also the prediction result of at least one preceding prediction step of the prediction interval. The behavior of the participant in a prediction interval is thus predicted here by linking together a plurality of single-step predictions for the individual prediction steps of the prediction interval. Each prediction step influences the subsequent prediction steps of the prediction interval.

Predicting the future is inherently uncertain and prone to errors, wherein a distinction must be made between the uncertainty of the future itself, which is referred to as aleatory uncertainty, and the uncertainty of the prediction of the future, which is referred to as epistemic uncertainty.

The main causes of the epistemic uncertainty of the prediction are perception-related shortcomings as well as insufficient performance of the prediction component, so that the epistemic uncertainty of the prediction is subject to context-dependent fluctuations. The perception-related defects include, for example, insufficient sensor equipment, so that a sufficient amount of meaningful scene-specific data cannot be collected, a defective sensor performance, which may be due to components, age or also environment, or also a misinterpretation of the scene-specific data within the perception component. An insufficient performance of a DL-based prediction component is usually attributable to the training data used, which are reflected in the weights of the DL component, but may also be attributable to a DL component architecture unsuitable for the prediction problem.

SUMMARY

The present invention provides measures which make it possible to take into account the epistemic uncertainty of the prediction in the behavior planning and to also account for the context-dependent temporal fluctuations of the epistemic uncertainty. Through these measures, the safety of the maneuver planning can be significantly increased overall.

According to an example embodiment of the present invention, this may be achieved in that the epistemic uncertainty of the predicted behavior is determined for each prediction step of a prediction interval and is evaluated by means of a decision criterion in order to decide whether the behavior of the further participant predicted for the corresponding prediction step is taken into account in the behavior planning for the first participant.

Since the epistemic uncertainty of the predicted behavior is newly determined according to the present invention in each prediction step of a prediction interval, temporal fluctuations of the epistemic uncertainty which occur within a prediction interval can also be taken into account in the behavior planning. For this purpose, the epistemic uncertainty is compared to a decision criterion in each prediction step in order to decide whether the behavior of the further participant predicted for this prediction step can be taken into account in the behavior planning for the first participant. That is to say, the fulfillment of the decision criterion is a prerequisite for the behavior of the further participant predicted in a prediction step being taken into account in the behavior planning for the first participant. Consequently, the behavior of the further participant predicted for this prediction step is not taken into account in the behavior planning for the first participant if the decision criterion is not fulfilled. In this case, the further participant is taken into account in the behavior planning for the first participant, for example in that a safety zone which covers all possible movements of the further participant is kept free. However, this measure is independent of the behavior that was predicted for the further participant. If the decision criterion is fulfilled for a prediction step, a planning component can trust the prediction and thus determine the space that the further participant will possibly occupy in the time period of the prediction step. In the behavior planning for the first participant, this individually determined space can then be treated as non-drivable.

The provided measures according to the present invention contribute considerably to the safety of maneuver planning since the behavior planning according to the invention is based exclusively on prediction steps which are classified as reliable on the basis of an evaluation of the epistemic certainty of the predicted behavior.

In an advantageous example embodiment of the method according to the present invention, the epistemic uncertainty of the predicted behavior of the further participant is quantified so that at least one threshold value for the epistemic uncertainty can be selected as a decision criterion.

In principle, there are different possibilities for determining or quantifying the epistemic uncertainty of the predicted behavior of a further participant. For example, the different causes for the epistemic uncertainty could be monitored and evaluated.

Another possibility is to evaluate the predicted behavior itself. For this purpose, variance could, for example, be induced into the DL-based prediction in order to thus generate a specified number of different predictions for the individual behavior options for given scene-specific input data. A measure for the epistemic uncertainty of the predicted behavior could then be derived from the deviation between the different predictions. In DL-based autoregressive prediction methods, the epistemic uncertainty of the predicted behavior could be evaluated on the basis of a reconstruction error, i.e., on the basis of the deviation between the predicted behavior and a behavior of the participant reconstructed on the basis of the predicted behavior. Regardless of the metric used in each case, determining a common value for the epistemic uncertainty for all predicted behavior options of a prediction step proves to be advantageous because it is easy to handle.

In an advantageous development of the method according to the present invention, the decision criterion is context-dependent, i.e., dependent on the relevant current traffic situation. For this purpose, the at least one threshold value could depend on the positions and/or movement states of the participants in the traffic scene, in particular on their velocities. Alternatively or also additionally, the at least one threshold value could also depend on current environmental conditions of the traffic scene, in particular the geographical conditions, weather conditions, visibility conditions and/or road conditions.

As mentioned above, according to the present invention, the epistemic uncertainty of the predicted behavior is determined for each prediction step of a prediction interval in order to use the decision criterion to check whether this behavior predicted for the further participant can be taken into account in the behavior planning for the first participant.

In a first variant of the method according to the present invention, the decision as to whether the predicted behavior is actually taken into account in the behavior planning for the first participant is made for each prediction step of a prediction interval independently of the other prediction steps of this prediction interval. This is because, in this case, all prediction steps of a prediction interval for which the decision criterion is fulfilled are taken into account in the behavior planning for the first participant.

In a second variant of the method according to the present invention, only the prediction steps of a prediction interval for which the decision criterion is fulfilled and for all preceding prediction steps of which the decision criterion is likewise fulfilled are taken into account in the behavior planning for the first participant. That is to say, the behavior of a prediction interval predicted for the further participant is only taken into account in the behavior planning for the first participant as long as the decision criterion is fulfilled. From the first prediction step which does not fulfill the decision criterion, the consideration of the predicted behavior for this prediction interval ends. As a result of this measure, computing power can be saved during the planning without the planning reliability being impaired thereby.

If an autoregressive prediction method is used for the prediction of the behavior of the further participant, computing power can additionally also be saved within the scope of the prediction. For this purpose, the prediction in a third variant of the method according to the invention is terminated in a prediction interval as soon as the epistemic uncertainty determined in a prediction step does not fulfill the decision criterion for consideration in the behavior planning of the first participant. Since the prediction of a prediction step in autoregressive prediction methods also always depends on the predictions of the preceding prediction steps of the prediction interval, it can be assumed that the prediction steps of a prediction interval which follow a prediction step with a high epistemic uncertainty are likewise subject to a high epistemic uncertainty. Such a termination of the prediction thus does not have a negative effect on the planning reliability, especially since it is limited to the current prediction interval and has no effect at all on the following prediction intervals.

BRIEF DESCRIPTION OF THE DRAWINGS

The measures according to the present invention and preferred implementation options are explained in more detail below with reference to the figures.

DETAILED DESCRIPTION OF EXAMPLE EMBODIMENTS

Figure 1:
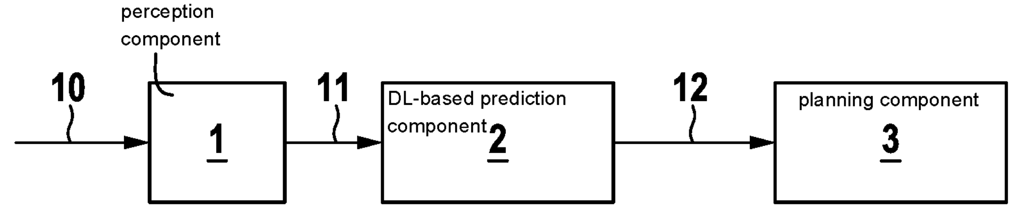
FIG. 1 illustrates the functionality of a computer-implemented system according to an example embodiment of the present invention for carrying out a method for behavior planning for an automated vehicle using a block diagram.

The block diagram of FIG. 1 shows a perception component 1 of an at least partially automated vehicle, which component aggregates scene-specific information 10 from different onboard and possibly also off-board information sources. The scene-specific information 10 is generally data that are detected by camera sensors, lidar sensors and/or radar sensors. In addition, scene-specific information 10 can also be detected by means of inertial sensors of the vehicle. The scene-specific information 10 is also often supplemented by GPS data and map data, as well as weather data and road condition data. The scene-specific information 10 aggregated at a given point in time generally includes the sensor data and other data that are current at this point in time. However, it may also include sensor data and other data collected over a specified time period until the given point in time.

The aggregated scene-specific information 10 is evaluated by the perception component 1 in order to recognize and locate objects and participants in the current traffic scene. Furthermore, the perception component 1 in the exemplary embodiment described here is equipped with a neural network in order to generate a set of latent features for each participant on the basis of the aggregated scene-specific information 10.

In the exemplary embodiment described here, these sets of latent features serve as input for a DL-based prediction component 2 of the vehicle. This can be a one-shot prediction component or an autoregressive prediction component. Here, the neural network of the prediction component 2 predicts a specified number of behavior options 12 for a participant at regular time intervals, specifically using the set of latent features 11 currently generated for this participant in each case. The prediction takes place in each case for a specified time interval, which is referred to in the context of the invention as a prediction interval or also as a prediction horizon. The totality of the predicted behavior options is referred to as predicted behavior below. Each prediction interval comprises a specified number of prediction steps, which can each correspond to a time step or a plurality of time steps. The prediction thus always takes place at least indirectly on the basis of the scene-specific information 10 aggregated at a current point in time. The future behavior of the participant can, for example, be predicted in the form of trajectories, i.e., in the form of position data x, y of the participant for consecutive points in time of the prediction interval. In addition, the trajectory information can also include movement information for the participant, such as velocity data and acceleration data, and/or orientation information or information on the spatial orientation of the participant, e.g., in the form of steering angle information.

In the exemplary embodiment described here, the prediction component 2 is designed to determine an uncertainty value, which quantifies the epistemic uncertainty of the predicted behavior 12, for each prediction step. This uncertainty value is compared to a decision criterion in order to decide whether the behavior of the further participant predicted for the corresponding prediction step is to be taken into account in the individual behavior planning. This can simply be a predetermined threshold value. However, the decision criterion may also be selected in a situation-dependent manner in that it is modified, for example, on the basis of the current position of the vehicle and of movement information or is updated at regular time intervals.

In any case, the predicted behavior 12 in the exemplary embodiment of the invention described here is only transferred to a planning component 3 if the decision criterion is fulfilled for the corresponding prediction step, i.e., if the epistemic uncertainty of the predicted behavior 12 is below a specified threshold value, for example.

Consequently, the planning component 3 takes into account in the behavior planning only those prediction steps that have been classified as not too unreliable. In these cases, the planning component 3 can, for example, trust the prediction and can treat, as non-drivable, the space that will be occupied by the further participant in the future and that can be determined by the prediction. If the epistemic uncertainty value is above the threshold value in a prediction step, the predicted behavior is not transferred to the planning component 3, so that it also cannot be taken into account by the planning component 3. Instead, the planning component 3 assigns a safety zone to the corresponding participant, which safety zone covers the entire space that may potentially be travelled in by this participant in this prediction step. This safety zone is treated as non-drivable by the planning component 3. It is independent of the predicted behavior of the participant.

This procedure contributes significantly to the planning reliability of the planning component 3.

At this point, it should be noted that the determination of epistemic uncertainty and the evaluation thereof on the basis of a decision criterion could alternatively also take place in a separate component connected downstream of the prediction component, which separate component then makes the decision about passing the predicted behavior to the planning component.

However, the procedure according to the invention could also be implemented if the planning component determines and/or evaluates the epistemic uncertainty of the predicted behavior. In this case, the planning component would decide whether or not a prediction step is taken into account in the behavior planning.

Figure 2:
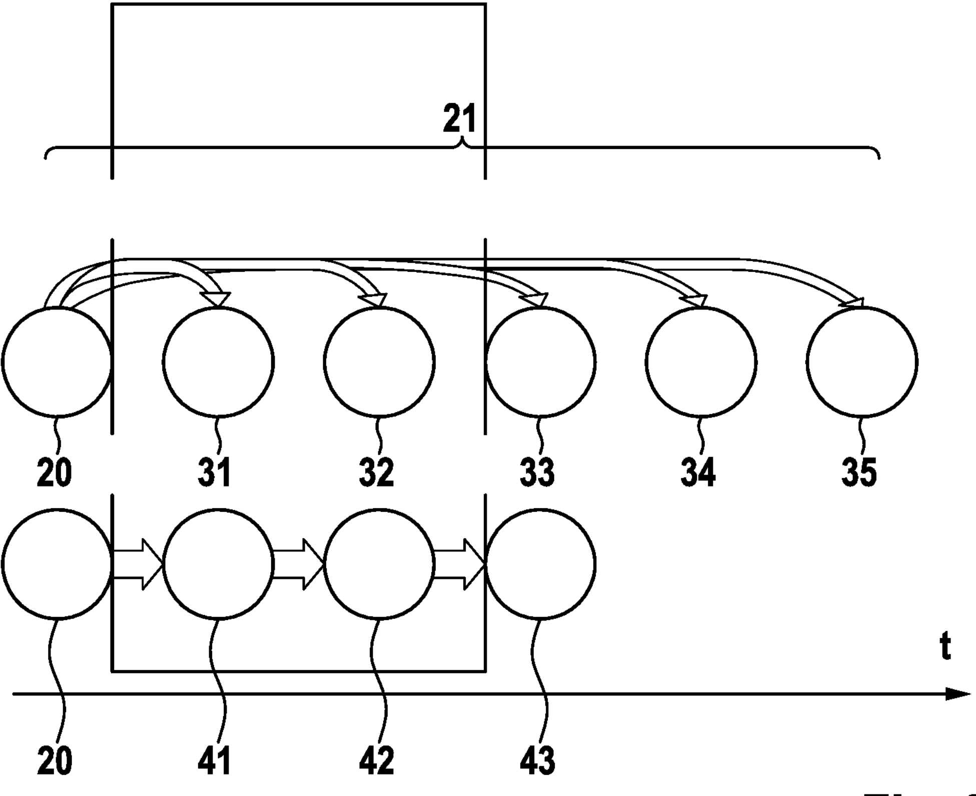
FIG. 2 illustrates two preferred example embodiments of the method according to the present invention for behavior planning using the example of a one-shot prediction in the upper image half and of an autoregressive prediction in the lower image half.

For FIG. 2, an abstract representation form was selected in order to illustrate a one-shot prediction method in the upper image half and an autoregressive prediction method in the lower image half. A current point in time 20 and a subsequent prediction interval 21 with five prediction steps 31 to 35 or 41 to 43 are shown in each case. Each prediction step 31 to 35 or 41 to 43 can correspond to a time step, or the prediction interval can correspond to a time segment with a plurality of time steps. In the one-shot prediction shown in the upper image half, the predictions for the individual prediction steps 31 to 35 were generated independently of one another, specifically exclusively on the basis of the scene-specific information aggregated up to the current point in time 20, which is indicated by the arrows, which each start from the current point in time 20 and point to a prediction step 31, 32, 33, 34 or 35. In contrast, the prediction of the individual prediction steps 41, 42, 43 in the autoregressive prediction shown in the lower image half is based not only on the scene-specific information aggregated up to the current point in time 20 but also on the predictions of the preceding prediction steps of the prediction interval 21. This is likewise symbolized here by arrows, which each start from a prediction step of the prediction interval and end at the next prediction step of the prediction interval.

In both cases, one-shot prediction and autoregressive prediction, the epistemic uncertainty $\sigma_t$ of the predicted behavior is determined according to the invention for each prediction step 31 to 35 or 41 to 43 of the prediction interval 21 and is evaluated by means of a threshold value t in order to decide whether the behavior predicted for the relevant prediction step is to be passed to a planning component for behavior planning.

In the one-shot prediction method of the exemplary embodiment described here, the epistemic uncertainty of the prediction steps 33 and 34 is above the threshold value t, and the epistemic uncertainty for the remaining prediction steps 31, 32 and 35 is below the threshold value so that the decision criterion is fulfilled here. Nevertheless, in the present exemplary embodiment, only the predicted behavior of the prediction steps 31 and 32 is passed to the planning component. This is because, in addition to the decision criterion t, all earlier prediction steps of the prediction interval should also have been classified as reliable here, as a further requirement. Neither the predicted behavior of the "unreliable" prediction steps 33 and 34 nor the predicted behavior of the "reliable" prediction step 35 are therefore passed to the planning component, even though the prediction step 35 fulfills the decision criterion $\tau$.

In the autoregressive prediction method, it is already checked for each of the consecutive prediction steps 41, 42, . . . , whether the epistemic uncertainty is below the threshold value t. This decision criterion is fulfilled here for the first two prediction steps 41 and 42 of the prediction interval 21. The behavior predicted for these prediction steps 41 and 42 is therefore transmitted to the planning component. In the prediction step 43, this criterion is however not met, so that this prediction step and also all further prediction steps of the prediction interval 21 are no longer to be taken into account in the behavior planning. The prediction method for this prediction interval 21 is therefore terminated here. Two prediction steps are thereby saved in the present case. This measure can significantly increase the efficiency in the behavior planning overall.

For describing the two method variants discussed above, the following notation is used:

t index of a prediction step $\sigma_t$ epistemic uncertainty value of the prediction step $\tau$ uncertainty threshold value N number of prediction steps of the prediction interval Method for One-Shot Predictions:

1. Predict all N prediction steps
2. Determine epistemic uncertainty values $\sigma_t$ for all N prediction steps
3. Compare all uncertainty values $\sigma_t$ to threshold value $\tau$
4. Transmit all prediction steps whose uncertainty values are below the threshold value ($\sigma_t<\tau$) to the planning component if the uncertainty values of all preceding prediction steps are also below the threshold value ($\sigma_{t-1}<\tau$), Method for Autoregressive Predictions:

1. Predict a prediction step $\tau$
2. Determine epistemic uncertainty value $\sigma_t$ for this prediction step
3. Compare uncertainty value $\sigma_t$ to threshold $\tau$
   a. $\sigma_t<\tau$: Repeats steps 1 to 3 for the next prediction step
   b. $\sigma_t\geq\tau$: End of the prediction
4. Transmit all preceding prediction steps to planning component

What is claimed is:

1. A computer-implemented method for an ego vehicle, the method comprising the following steps:

during a drive of the ego vehicle in an environment, obtaining, from one or more sensors of the ego vehicle and by a processor system of the ego vehicle that includes one or more processors, scene-specific information of a traffic scene in the environment, the sensors including a camera, lidar, and/or a radar sensor;

predicting, by the processor system and by executing a prediction model comprising a neural network having a plurality of layers and that learns a mapping between input data and output predictions, a future behavior of a further traffic participant external to the ego vehicle for a prediction interval extending forward in time from a present time, the prediction interval subdivided into a plurality of consecutive prediction steps each corresponding to a respective equal-length increment of time;

for each of the prediction steps:

determining, by the processor system and using the prediction model, an epistemic uncertainty of the predicted behavior of the further traffic participant at that respective prediction step; and evaluating, by the processor system, whether the epistemic uncertainty determined for the respective prediction step satisfies a predefined decision criterion;

selecting, by the processor system and based on results of the evaluation, which of the prediction steps of the predicted behavior of the further traffic participant are used for selecting a driving behavior of the ego vehicle; and controlling, by the processor system, maneuvers of the ego vehicle according to the selection.

2. The method according to claim 1, wherein the epistemic uncertainty of the predicted behavior of the further traffic participant is quantified, and at least one threshold value for the epistemic uncertainty is selected as the decision criterion.

3. The method according to claim 2, wherein at least one context-dependent threshold value is selected as the decision criterion, wherein the context-dependent threshold value depends on: (i) positions and/or movement states of participants in the traffic scene, and/or (ii) current environmental conditions of the traffic scene including geographical conditions and/or weather conditions and/or visibility conditions and/or road conditions.

4. The method according to claim 1, wherein the predicted behavior of the further traffic participant from all of the prediction steps of the prediction interval for which the decision criterion is satisfied is used in controlling the maneuvers of the ego vehicle.

5. The method according to claim 1, wherein the predicted behavior of the further traffic participant from a first one of the prediction steps of the prediction interval for which the decision criterion is satisfied is taken into account in controlling the maneuvers of the ego vehicle only when the decision criterion is also satisfied for all preceding prediction steps of the prediction interval that precede the first one of the prediction steps.

6. The method according to claim 1, wherein an autoregressive prediction method is used for the prediction of the future behavior of the further traffic participant, wherein the prediction of the prediction interval is terminated, prior to completion of the prediction of the prediction interval, as soon as the epistemic uncertainty determined in a prediction step of the prediction interval does not satisfy the decision criterion for use in controlling the maneuvers of the ego vehicle.

7. The method according to claim 1, wherein, when the decision criterion is not satisfied for a prediction step, the control is performed by a planning algorithm that treats, for that prediction step, a safety zone that covers movements potentially travelable by the further traffic participant as non-drivable, independently of the predicted behavior.

8. A computer-implemented system of an ego vehicle, the system comprising:

a processor system that includes at least one processor; and a sensor system that includes one or more sensors, the one or more sensors including a camera, lidar, and/or a radar sensor;

wherein the processor system is configured to perform the following during a drive of the ego vehicle in an environment:

obtain, from the sensor system, scene-specific information of a traffic scene in the environment;

predict, by executing a prediction model comprising a neural network having a plurality of layers and that learns a mapping between input data and output predictions, a future behavior of a further traffic participant external to the ego vehicle for a prediction interval extending forward in time from a present time, the prediction interval subdivided into a plurality of consecutive prediction steps each corresponding to a respective equal-length increment of time;

for each of the prediction steps:

determine, using the prediction model, an epistemic uncertainty of the predicted behavior of the further traffic participant at that respective prediction step; and evaluate whether the epistemic uncertainty determined for the respective prediction step satisfies a predefined decision criterion;

select, by the processor system and based on results of the evaluation, which of the prediction steps of the predicted behavior of the further traffic participant are used for selecting a driving behavior of the ego vehicle; and control, by the processor system, maneuvers of the ego vehicle according to the selection.

* * * * *